(12) United States Patent
Tesanovic

(10) Patent No.: US 11,558,297 B2
(45) Date of Patent: Jan. 17, 2023

(54) METHOD AND APPARATUS FOR FLOW CONTROL IN A WIRELESS COMMUNICATION SYSTEM

(71) Applicant: Samsung Electronics Co., Ltd., Gyeonggi-do (KR)

(72) Inventor: Milos Tesanovic, Middlesex (GB)

(73) Assignee: Samsung Electronics Co., Ltd

( * ) Notice: Subject to any disclaimer, the term of this patent is extended or adjusted under 35 U.S.C. 154(b) by 32 days.

(21) Appl. No.: 17/036,270

(22) Filed: Sep. 29, 2020

(65) Prior Publication Data

US 2021/0119920 A1 Apr. 22, 2021

(30) Foreign Application Priority Data

Oct. 3, 2019 (GB) ..................... 1914306

(51) Int. Cl.
*H04L 12/801* (2013.01)
*H04L 47/12* (2022.01)
*H04L 47/30* (2022.01)

(52) U.S. Cl.
CPC .............. *H04L 47/12* (2013.01); *H04L 47/30* (2013.01)

(58) Field of Classification Search
CPC ......... H04L 47/12; H04L 47/30; H04L 47/26; H04L 47/127; H04L 47/14; H04L 47/17; H04L 47/25; H04L 29/06; H04L 47/122; H04L 5/0053; H04L 5/0048; H04L 5/001; H04L 5/0094; H04W 28/0278; H04W 28/10; H04W 28/02; H04W 28/0284; H04W 40/02; H04W 88/04; H04W 24/04; H04W 76/12; H04W 24/02; H04W 40/22; H04W 36/08; H04W 68/02; H04W 4/06; H04W 28/18; H04W 76/10; H04W 48/12; H04W 36/0079; H04W 28/0263; H04W 76/11; H04W 76/19; H04W 72/042;
(Continued)

(56) References Cited

U.S. PATENT DOCUMENTS 8,576,714 B2 11/2013 Yang et al.
2010/0034148 A1 2/2010 Zhang et al.
(Continued)

FOREIGN PATENT DOCUMENTS

KR 101764284 B1 * 8/2017 ............. H04B 7/026
WO WO-2007053948 A1 * 5/2007 ......... H04B 7/15507
(Continued)

OTHER PUBLICATIONS

Mao et al. U.S. Appl. No. 62/909,068, filed Oct. 1, 2019 (Year: 2019).*
(Continued)

*Primary Examiner* — Wutchung Chu
(74) *Attorney, Agent, or Firm* — The Farrell Law Firm, P.C.

(57) ABSTRACT

A method performed by a first node for flow control in a wireless communication system is provided. The method includes identifying a triggering event for transmitting downlink flow control feedback information, generating the downlink flow control feedback information including an available buffer size based on the identified triggering event, and transmitting, to a second node, a backhaul adaptation protocol (BAP) layer message including the downlink flow control feedback information.

18 Claims, 6 Drawing Sheets

(58) Field of Classification Search
CPC . H04W 24/10; H04W 28/0268; H04W 76/15; H04W 16/26; H04W 36/0055; H04W 52/0216; H04W 74/0808; H04W 24/08; H04W 28/06; H04B 7/2606; H04B 7/0695; H04B 7/024

See application file for complete search history.

(56) References Cited

U.S. PATENT DOCUMENTS

| | | | | |
|---|---|---|---|---|
| 2013/0128896 | A1* | 5/2013 | Munoz | H04L 49/109 370/412 |
| 2014/0215001 | A1* | 7/2014 | Tucek | H04L 67/5681 709/213 |
| 2018/0091264 | A1 | 3/2018 | Laselva et al. | |
| 2018/0131418 | A1 | 5/2018 | Wang et al. | |
| 2021/0058826 | A1* | 2/2021 | Mao | H04W 28/0808 |
| 2021/0105795 | A1* | 4/2021 | Zhu | H04W 40/34 |
| 2021/0235291 | A1* | 7/2021 | Byun | H04W 24/04 |

FOREIGN PATENT DOCUMENTS

| | | | | |
|---|---|---|---|---|
| WO | WO 2018/237001 | | 12/2018 | |
| WO | WO 2019/095317 | | 5/2019 | |
| WO | WO-2019242683 | A1 * | 12/2019 | ........... H04B 7/2606 |
| WO | WO-2021026706 | A1 * | 2/2021 | |
| WO | WO-2021056345 | A1 * | 4/2021 | |
| WO | WO-2021062803 | A1 * | 4/2021 | .......... H04W 40/248 |

OTHER PUBLICATIONS

ZTE Corporation, Sanechips, "Discussion on Flow Control in IAB", R3-191300, 3GPP TSG RAN WG3 meeting #103bis, Apr. 8-12, 2019, 5 pages.

LG Electronics Inc., "Downlink Flow Control Mechanism in IAB", R2-1907954, 3GPP TSG-RAN WG2 Meeting #106, May 13-17, 2019, 4 pages.

European Search Report dated Jun. 21, 2021 issued in counterpart application No. 20872160.5-1215, 11 pages.

ZTE, "Report of Email Discussion [106#44][IAB] Flow Control", R2-1909622, 3GPP TSG-RAN WG2 #107, Aug. 26-30, 2019, 26 pages.

ZTE Corporation, Sanechips, "Discussion on DL Flow Control in IAB", R2-1909623, 3GPP TSG RAN WG2 Meeting #107, Aug. 26-30, 2019, 4 pages.

Huawei, HiSilicon, "Remaining Issues on Flow Control", R2-1911213, 3GPP TSG-RAN WG2 Meeting #107, Aug. 26-30, 2019, 3 pages.

International Search Report dated Jan. 5, 2021 issued in counterpart application No. PCT/KR2020/013377, 9 pages.

Chinese Office Action dated Jan. 27, 2022 issued in counterpart application No. 202080007413.6, 18 pages.

Chinese Office Action dated Apr. 27, 2022 issued in counterpart application No. 202080007413.6, 18 pages.

Chinese Office Action dated Jul. 26, 2022 issued in counterpart application No. 202080007413.6, 17 pages.

* cited by examiner

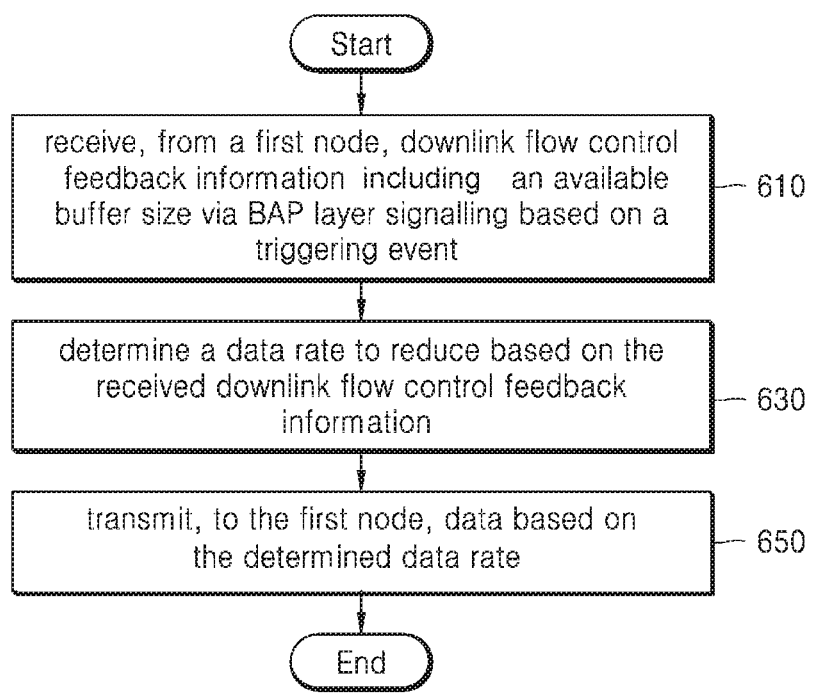

METHOD AND APPARATUS FOR FLOW CONTROL IN A WIRELESS COMMUNICATION SYSTEM

CROSS-REFERENCE TO RELATED APPLICATION(S)

This application is based on and claims priority under 35 U.S.C. § 119 to Great Britain Application No. 1914306.4, filed on Oct. 3, 2019 in the Great Britain Intellectual Property Office, the disclosure of which is incorporated by reference herein in its entirety.

BACKGROUND

1. Field

The disclosure relates generally to wireless communication systems and, more particularly, to methods, apparatus and/or systems for flow control. The disclosure provides methods, apparatus and/or systems for downlink (DL) hop-by-hop (HbH) flow control within 3rd generation partnership project (3GPP) 5th generation (5G) new radio (NR) and NR-based relay networks.

2. Description of Related Art

To meet the demand for wireless data traffic having increased since deployment of 4th generation (4G) communication systems, efforts have been made to develop an improved 5G or pre-5G communication system. The 5G or pre-5G communication system is also called a "beyond 4G network" or a "post long term evolution (LTE) system". The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Fehers quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving to the Internet of things (IoT), where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services may be provided according to the development of a wireless communication system, and thus a method for easily providing such services is required.

In 3GPP 5G NR, flow control is needed in integrated access and backhaul (IAB) networks to prevent congestion occurring. There are two main types of flow control in relay networks: end-to-end and HbH.

On the uplink (UL), resource allocation serves as a form of flow control (the parent node has full control over UL transmissions of its child nodes). For the DL, end-to-end flow control mechanisms are already in place. However, HbH DL flow control for IAB is currently being developed in 3GPP.

Several open issues for further study need to be finalized in order to design a working IAB system. What is needed is a technique for flow control, and in particular a technique for DL HbH flow control within 3GPP 5G NR and NR-based relay networks.

SUMMARY

The present disclosure has been made to address at least the disadvantages described above and to provide at least the advantages described below.

In accordance with an aspect of the present disclosure, a method performed by a first node for flow control in a wireless communication system is provided. The method includes identifying a triggering event for transmitting downlink flow control feedback information, generating the downlink flow control feedback information including an available buffer size based on the identified triggering event, and transmitting, to a second node, a backhaul adaptation protocol (BAP) layer message including the downlink flow control feedback information.

In one embodiment, the triggering event for transmitting the downlink flow control feedback information may include at least one of an event associated with a buffer load or an event associated with flow control polling.

In one embodiment, the downlink flow control feedback information may include at least one of a first BAP control information including the available buffer size, a type for flow control feedback and an identity (ID) of an egress link, or a second BAP control information including the available buffer size, a type for flow control feedback, and an identity of a bearer or a bearer group.

In one embodiment, the downlink flow control feedback information may include a BAP control information including a type of control information. In addition, the type of control information may include a type for flow control feedback per backhaul link, a type for flow control feedback per a subset of bearers or a type for flow control feedback polling.

In one embodiment, the event associated with a buffer load may include an event that the buffer load exceeds a certain level. In addition, the event associated with flow control polling may include an event that a BAP control information for flow control polling is received.

In one embodiment, the available buffer size may include at least one of an available buffer size for an ingress link or an available buffer size for a subset of bearers.

In one embodiment, the downlink flow control feedback information may be reported only for at least one of a certain bearer, a group of bearers, an egress backhaul channel, an ingress backhaul channel, or flow control polling.

In one embodiment, the flow control polling may be triggered by reception of a BAP control information for flow control polling.

In one embodiment, the downlink flow control feedback information may be used for reducing the data for a specific destination or reducing the data rate for specific bearers or a group of bearers by the second node.

In accordance with an aspect of the present disclosure, a method performed by a second node for flow control in a wireless communication system is provided. The method includes receiving, from a first node, downlink flow control feedback information including an available buffer size via a BAP layer signaling based on a triggering event, determining a data rate to reduce based on the received downlink flow control feedback information, and transmitting, to the first node, data based on the determined data rate. The triggering event includes at least one of an event associated with a buffer load or an event associated with flow control polling.

In accordance with an aspect of the present disclosure, a first node for flow control in a wireless communication system is provided. The first node includes a transceiver and at least one processor configured to identify a triggering event for transmitting downlink flow control feedback information, generate the downlink flow control feedback information including an available buffer size based on the identified triggering event, and transmit, to a second node, a BAP layer message including the downlink flow control feedback information.

In accordance with an aspect of the present disclosure, a second node for flow control in a wireless communication system is provided. The second node includes a transceiver and at least one processor configured to receive, from a first node, downlink flow control feedback information including an available buffer size via a BAP layer signaling based on a triggering event, determine a data rate to reduce based on the received downlink flow control feedback information, and transmit, to the first node, data based on the determined data rate. The triggering event includes at least one of an event associated with a buffer load or an event associated with flow control polling, and the downlink flow control feedback information is included in a BAP layer control element (CE) or a BAP layer message.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 6 is a flow diagram of an operation performed by a second node, according to an embodiment.

DETAILED DESCRIPTION

Figure 1:
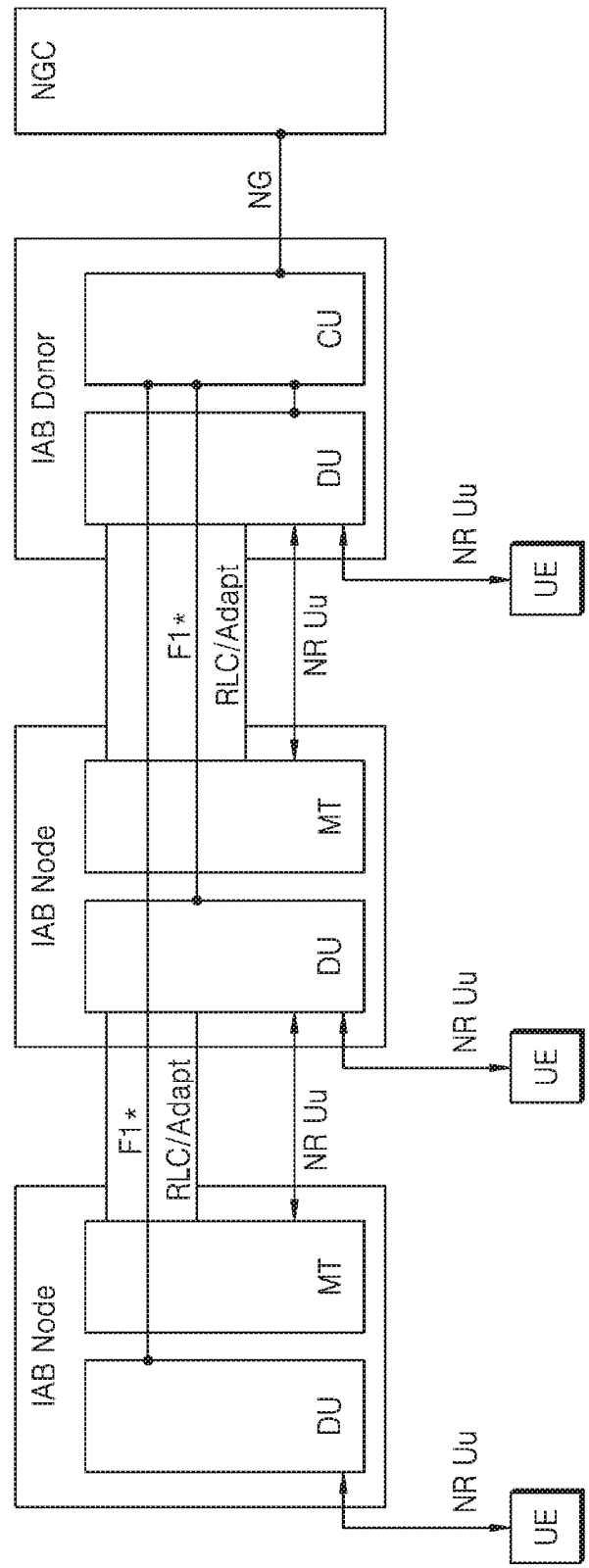
FIG. 1 illustrates an example architecture for multi-hop backhauling, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or apart thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

Embodiments of the present disclosure may be implemented in the form of any suitable method, system and/or apparatus for use in digital communication, such as in the form of an electronic device, mobile/portable terminal (e.g. mobile telephone), hand-held device, personal computer, digital television and/or digital radio broadcast transmitter and/or receiver apparatus, set-top-box, etc. Any such method, system and/or apparatus may be compatible with any suitable existing or future digital wireless system and/or standard including any existing or future releases of the same standards specification, such as 3GPP 5G NR.

One of skill in the art will appreciate that certain examples of the present disclosure may not be directly related to standardization but rather proprietary implementation of some of the IAB functions.

The examples disclosed herein are applicable to, and use terminology associated with, 3GPP 5G NR. However, one of skill in the art will appreciate that the techniques disclosed herein are not limited to 3GPP 5G NR. For example, the functionality of the various network entities disclosed herein may be applied to corresponding or equivalent entities in other communication systems or standards. Corresponding or equivalent entities may be regarded as entities that perform the same or similar role within the network. One of skill in the art will also appreciate that the transmission of information between network entities is not limited to the specific form or type of messages described in relation to the examples disclosed herein.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One of skill in the art will appreciate that one or more additional elements or entities may be added to the examples disclosed herein. One of skill in the art will also appreciate that one or more non-essential elements or entities may be omitted in certain examples.

The functions, processes or operations of a particular entity in one example may be divided between two or more separate entities in an alternative example. The functions, processes or operations of two or more separate entities in one example may be performed by a single entity in an alternative example.

Information carried by a particular message in one example may be carried by two or more separate messages in an alternative example. The information carried by two or more separate messages in one example may be carried by a single message in an alternative example.

The order in which operations are performed and/or the order in which messages are transmitted may be modified, if possible, in alternative examples.

There is provided a method for flow control in a network including at least a base station connected to the core network and a network node connected to the base station, either directly or via another node. The method includes reporting, by the network node, flow control feedback information (e.g. buffer load feedback information) to either a parent node or a child node of the network node, where the flow control feedback information includes one or more of the following: total amount of data in the buffers, buffer occupancy (e.g., as a fraction of full occupancy), buffer occupancy (e.g., as a fraction of a pre-defined or configured threshold), desired incoming data rate, available buffer size (e.g., in absolute or relative terms, relative being with respect to the total buffer size or to a pre-defined or configured threshold), and change in any of the above parameters compared to a previous report sent (e.g., only the information that the change has happened, or also the magnitude of said change, possibly quantized based on any signaling overhead considerations).

The base station may include, be replaced with, or be supplemented with, an access point, a gateway and/or an entity having no special role. The parent node may be a node closer to the top of the tree (e.g., in the case of a simple Spanning Tree), and/or the node through which data needs to pass to get to one end of the communication network. The child node may be a node in the other direction.

The network may include a network of nodes that propagate/forward/route (and possibly modify) a signal from source to destination. In certain examples, the network may be a relay network. In certain examples, the network node may be a relay node. In certain examples, the network may be a D2D network, or platooning in vehicular network.

The flow control feedback information is reported only for a certain bearer/group of bearers/egress backhaul channel/ingress backhaul channel.

Reporting the flow control feedback information includes one or more of grouping radio bearers into radio bearer groups (e.g., based on quality of signal (QoS) requirements and/or type of bearer) and reporting the flow control feedback information (e.g. buffer occupancy) per group, reporting only for a sub-set of radio bearers or a sub-set of radio bearer groups (e.g., based on a specific reporting configuration—pre-configured or received by the node—which limits the reporting set based on priority of a bearer/group of bearers and/or urgency), and reporting only for a sub-set of backhaul links (e.g., based on a specific reporting configuration—pre-configured or received by the node—which limits the reporting set based on one or more of past history of congestion, probability of radio link failure, and the importance of a certain link).

The reporting of the flow control feedback information is triggered according to one or more of the following: reporting periodically, as configured by a parent node (e.g., using a specific BAP layer CE), or by a centralized unit (e.g., by configuring/reconfiguring the node via appropriate control or management signaling, such as operation, administration and maintenance (OAM), or radio resource control (RRC)), reporting based on polling by a parent node (e.g., triggered by reception of a specific BAP layer CE), or by the centralized unit (CU) (e.g., change of node configuration via OAM or RRC), reporting triggered when buffer occupancy (e.g., total, or with a certain granularity, for only a subset of bearers/bearer groups) exceeds a certain threshold, or if the egress links suffer radio link failure, or are likely to be based on feedback from the child node of the child node, reporting triggered based on likely/imminent expiration of time stamps (e.g., a certain time, t, before the expiration), and reporting triggered when the difference between ingress and egress throughputs exceeds a certain threshold.

The reporting is configured for bearers carrying a specific service (e.g., a latency-critical service and/or signaling bearers) and/or having a certain priority. Only the buffer status of those bearers which are transiting the node in question are reported.

There is provided a method for flow control in a network including at least a base station connected to the core network and a network node connected to the base station, either directly or via another node. The method includes reporting, by the network node, sending flow control feedback information (e.g., buffer load feedback information) to either a parent node or a child node of the network node, where reporting the flow control feedback information includes one or more of grouping radio bearers into radio bearer groups (e.g., based on QoS requirements and/or type of bearer) and reporting flow control feedback information (e.g., buffer occupancy) per group, reporting only for a sub-set of radio bearers or a sub-set of radio bearer groups (e.g., based on a specific reporting configuration—pre-configured or received by the node—which limits the reporting set based on priority of a bearer/group of bearers and/or urgency), and reporting only for a sub-set of backhaul links (e.g., based on a specific reporting configuration—pre-configured or received by the node—which limits the reporting set based on one or more of past history of congestion, probability of radio link failure, and the importance of a certain link).

There is provided a method for flow control in a network including at least a base station connected to the core network and a network node connected to the base station, either directly or via another node. The method including reporting, by the network node, sending flow control feedback information (e.g., buffer load feedback information) to either a parent node or a child node of the network node, wherein the reporting of the flow control feedback information is triggered according to one or more of the following: reporting periodically, as configured by a parent node (e.g., using a specific BAP layer CE), or by a CU (e.g., by configuring/reconfiguring the node via OAM or RRC), reporting based on polling by a parent node (e.g. triggered by reception of a specific BAP layer CE), or by the centralized (e.g., change of node configuration via appropriate control or management signaling, such as OAM or RRC), reporting triggered when buffer occupancy (e.g., total, or with a certain granularity, for only a subset of bearers/bearer groups) exceeds a certain threshold, or if the egress links suffer radio link failure, or are likely to be based on feedback from the child node of the child node, reporting triggered based on likely/imminent expiration of time stamps (e.g., a certain time, t, before the expiration), and reporting triggered when the difference between ingress and egress throughputs exceeds a certain threshold.

A CU may be an entity which makes centralized decisions. The reporting is configured for bearers carrying a specific service (e.g., a latency-critical service and/or signaling bearers) and/or having a certain priority. Only the buffer status of those bearers which are transiting the node in question may be reported.

The method may also include receiving and processing, by an MT part of the BAP entity, a request for flow control feedback (e.g., load information), passing, by the MT part, the request to a DU part, triggering, by the DU part, flow control feedback and producing relevant information to be included in the report, passing, by the DU part, the information to the MT part, and sending, by the MT part of the BAP entity, the flow control feedback.

The MT part of the BAP entity receives and processes a request for flow control feedback, and produces and sends the report. The method further includes producing, by a centralized entity, a report.

The BAP CE includes an egress link ID or an ingress link ID and one or more of the link throughput, a desired incoming data rate, an indication of service type carried by this link, a desired (e.g., most suitable) QoS requirements of incoming data, a link buffer occupancy (e.g., in absolute terms or as a fraction of a pre-defined or configured threshold, or as a fraction of full buffer occupancy), an indication (e.g., a bit/group of bits/flag) of radio link failure, an indication (e.g., a bit/group of bits/flag) of potential congestion at the child node (of the child node) and an ID of said child node.

The BAP CE includes the bearer ID/bearer group ID and one or more of a desired incoming data rate, a desired (e.g., most suitable) QoS requirements of incoming data, a buffer occupancy (e.g., in absolute terms or as a fraction of a pre-defined or configured threshold, or as a fraction of full buffer occupancy), an indication of likely/imminent expiration of time stamps (e.g., a certain time, t, before the expiration), and an indication of data type.

The method further includes performing one or more of the following (by the IAB Node or the IAB Donor Node): reducing the data for a specific destination, reducing the data rate for specific bearers or a group of bearers, redirecting traffic over different child node either altogether, or only data belonging to certain bearers/groups of bearers, or only data destined for certain child node(s) of the child node, dropping certain data bearers (e.g., those of lower priority/best-effort data, or those whose time stamps are about to expire and are considered of little use), duplicating certain data bearers (e.g., if the risk of congestion is low and/or if certain backhaul channel(s) face radio link failure), and increasing redundancy/diversity in other ways (e.g., better error correction and/or lower modulation schemes).

The flow control feedback information may be reported from the IAB Node to the IAB Donor Node according to one or more of the following: piggy-backing on a data bearer, using RRC of the MT part of the parent node, and using a F1 application protocol (F1-AP) of the DU part of the parent node, using daisy-chaining at the BAP layer.

The flow control may be DL HbH flow control, where the base station is an IAB Donor node, and/or where the relay node is an IAB Node.

To satisfy extremely high data rate requirements, the 3GPP 5G NR standard utilizes communication frequencies in a relatively high range, from 30 GHz to 300 GHz, corresponding to wavelengths in the millimeter (mm) range (mmWave communication). Such mmWave communication provides a large available bandwidth and high transmission speeds. However, problems with mmWave communication include severe signal path loss and low penetration, resulting in a relatively short transmission range. This in turn requires a greater density of base stations deployment.

Due to the relatively high cost and other difficulties associated with deployment of fiber transport network links, wireless backhauling can be used as an alternative. IAB, in which a part of the radio resources is used for backhauling, is currently being standardized for 3GPP rel-16.

The backhaul architecture is expected to support multi-hop backhauling in which backhaul traffic is wirelessly relayed by network nodes via one or more hops using mmWave communication. Multi-hop backhauling provides more range extension than single hop. This is especially beneficial for above-6 GHz frequencies due to their limited range. Multi-hop backhauling further enables backhauling around obstacles, such as buildings in urban environment for in-clutter deployments.

IAB strives to reuse existing functions and interfaces defined for access. In particular, MT, gNB-DU, gNB-CU, user plane function (UPF), access and mobility management function (AMF) and session management function (SMF) as well as the corresponding interfaces NR Uu (an interface between a terminal and base station/access point) (between MT and gNB), F1 (an interface between a DU and a CU), NG (an interface between 5G RAN and core), X2 (an interface between two base stations) and N4 (an interface between the control plane and the user plane) are used as baseline for the IAB architectures.

The MT function has been defined as a component of the mobile equipment, and is referred to as a function residing on an IAB-node that terminates the radio interface layers of the backhaul Uu interface toward the IAB-donor or other IAB-nodes.

FIG. 1 illustrates an example architecture for multi-hop backhauling, according to an embodiment. FIG. 1 shows the reference diagram for a two-hop chain of IAB-nodes underneath an IAB-donor, where the IAB-node and the user equipment (UE) connect in stand-alone mode (SA-mode) to an NGC (control part of an NG).

An IAB-node may be defined as a RAN node that supports wireless access to UEs and wirelessly backhauls the access traffic. An IAB-donor may be defined as a RAN node which provides the UE's interface to the core network and wireless backhauling functionality to IAB-nodes.

The architecture of FIG. 1 leverages CU/DU-split architecture. That is, the IAB donor node includes a CU and one or more DUs, with an interface called F1 between them. The functionality of the IAB donor is divided between the CU (hosting RRC, service data adaptation protocol (SDAP) and packet data conversion protocol (PDCP), and which terminates the F1 interface connected with the DU) and DU (hosting radio link control (RLC), medium access control (MAC) and physical (PHY) layers, and which terminates the F1 interface with the CU) logical nodes. The internal structure (CU/DU) of the LAB donor is not visible to other nodes and the 5G core network (5GC).

In FIG. 1, each IAB-node holds a DU and an MT. Via the MT, the IAB-node connects to an upstream IAB-node or the IAB-donor. Via the DU, the IAB-node establishes RLC-channels to the UEs and to the MTs of downstream IAB-nodes. For MTs, this RLC-channel may refer to a modified RLC, RLC*. An IAB-node can connect to more than one upstream IAB-node or IAB-donor DU. The IAB-node may contain multiple DUs, but each DU part of the IAB-node has F1 control information (F1-C) connection only with one IAB-donor CU-control plane (CP).

The donor also holds a DU to support UEs and MTs of downstream IAB-nodes. The IAB-donor holds a CU for the DUs of all IAB-nodes and for its own DU. It is assumed that the DUs on an IAB-node are served by only one AB-donor. This TAB-donor may change through topology adaptation. Each DU on an IAB-node connects to the CU in the IAB-donor using a modified form of F1, which is referred to as F1*. F1*-U runs over RLC channels on the wireless backhaul between the MT on the serving IAB-node and the DU on the donor. An adaptation layer is added (BAP layer) in the ongoing normative phase—which performs bearer mapping and routing. It replaces the IP functionality of the standard F1-stack. F1*-U may carry a general packet radio service (GPRS) tunneling protocol (GTP-U) header for the end-to-end association between CU and DU.

The Uu interface represents the interface between the UE and the DU in an TAB node. The F1* interface represents the interface between the JAB DU and an upstream CU.

During the Study Item phase of the 3GPP work on IAB, only high-level concepts of flow control in IAB systems were discussed. The following was captured in TR 38.874v16.0.0 (January 2019):

End-to-end flow control (e.g. flow control via F1-U or F1*-U) could help to address packet discard at the intermediate IAB-nodes due to the downlink data congestion problem to some extent by providing a downlink delivery status from the UE's access IAB-node DU in hop-by-hop ARQ to the IAB-donor CU . . . . Thus, hop-by-hop flow control may also be required together with end-to-end congestion handling.

The congested IAB-node may provide feedback information to the parent IAB-node or the IAB-donor. Based on this feedback, the parent IAB-node or IAB-donor may perform flow control and alleviate downlink data congestion.

The flow control feedback may include the following information:
  IAB-node buffer load
  IAB-node ID, where the congestion has occurred,
  Potentially other information.

The granularity of the feedback information can be e.g. per UE radio bearer, per RLC-channel, per backhaul link.

More recently, at 3GPP RAN2 #107 meeting in Prague (August 2019), as part of the Work Item phase of IAB, the following was agreed:
  One hop DL flow control feedback is considered for DL hop-by-hop flow control, i.e. congested IAB node feedback flow control info to its parent IAB node.
  DL One-hopflow controlfeedback should include the IAB node buffer load (details FFS) and flow control granularity info. FFS other information.
  Per BH RLC channel based flow control feedback can be considered as baseline. FFS on the necessity of other flow control granularity
  BAP layer supports the DL hop-by-hop flow control and flow controlfeedback function
  It is FFS how to trigger the DL hop-by-hop flow control in IAB network It can be seen from above that HbH DL flow control is not yet fully defined.

In FIG. 1, the DU part of the parent node, acting as access point to the MT part of the child node, does not know the conditions on the egress link of the DU part of the child node. In other words, the DU side of the parent IAB-node may not know the downlink buffer status of the child IAB-node. This is one of the reasons the flow control feedback is required.

In certain examples of the present disclosure, the buffer load information may include at least one or more of the following: total amount of data in the buffers, buffer occupancy (e.g., as a fraction of full occupancy), buffer occupancy (e.g., as a fraction of a pre-defined or configured threshold), desired incoming data rate, available buffer size (e.g., in absolute or relative terms), change in any of the above parameters compared to a previous report sent, or any of the above, but only for a certain bearer/group of bearers/egress backhaul channel/ingress backhaul channel.

The above information may be provided with respect to a certain granularity. Examples of granularity include per UE radio bearer, per RLC-channel, and per backhaul link.

Radio bearers may be grouped into radio bearer groups, based on QoS requirements, type of bearer (data bearer, signaling bearer, and node's own traffic (e.g., OAM)) and reporting the buffer occupancy per group.

The method may report, only for a sub-set of radio bearers or a sub-set of radio bearer groups based on a specific reporting configuration—pre-configured or received by the node—which limits the reporting set on priority of a bearer/group of bearers and urgency (e.g., as measured by an associated time stamp which may expire).

The method may report, only for a sub-set of backhaul links based on a specific reporting configuration—pre-configured or received by the node—which limits the reporting set based on one or more of past history of congestion, probability of radio link failure, and the importance of a certain link (e.g., it is carrying control signaling or OAM).

The present disclosure may provide additional buffer load information as discussed below in relation to formats of the relevant BAP CE.

The trigger for the flow control feedback may be defined according to one or more of the following.

Reporting may be periodic, as configured by the parent node (e.g., by using a specific BAP layer CE), or by the CU (e.g., by reconfiguring the node via OAM or RRC).

Reporting may be based on polling by the parent node (e.g., triggered by reception of a specific BAP layer CE), or by the CU (e.g., change of node configuration via OAM or RRC).

Reporting may be triggered when buffer occupancy (e.g., total, or with a certain granularity, for only a subset of bearers/bearer groups) exceeds a certain threshold, or if the egress links suffer radio link failure, or are likely to, based on feedback from the child node of the child node.

Reporting may be triggered based on likely/imminent expiration of time stamps (e.g., a certain time, t, before the expiration).

Reporting may be triggered when the difference between ingress and egress throughputs exceeds a certain threshold.

The above reporting may be configured for bearers carrying a specific service (e.g., a latency-critical service (e.g., ultra-reliable low latency communication (URLLC)), or signaling bearers) or having a certain priority.

Figure 2:
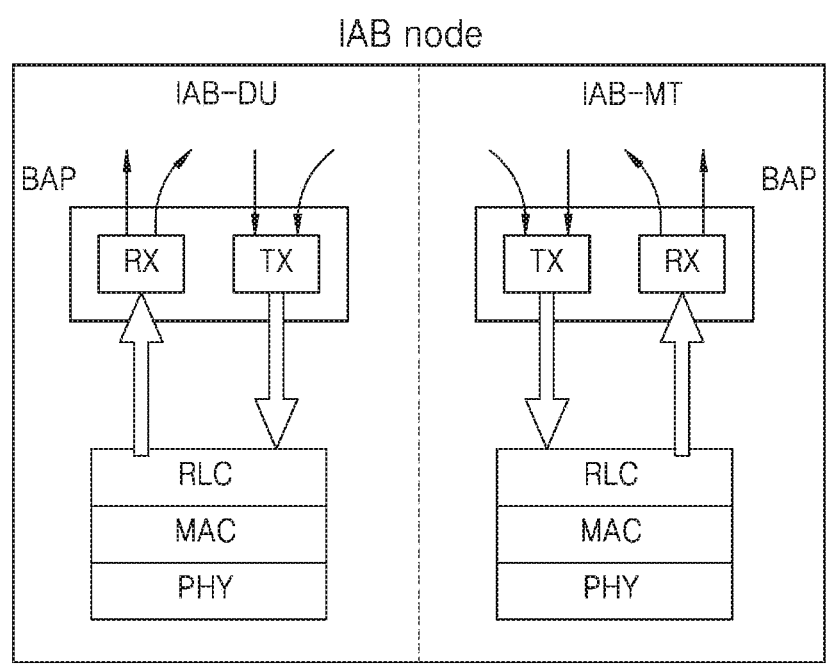
FIG. 2 illustrates communication between the BAP of the distributed unit (DU) part and the BAP of the mobile-termination (MT) part in an IAB node, according to an embodiment.

FIG. 2 illustrates communication between the BAP of the DU part and the BAP of the MT part in an IAB node, according to an embodiment.

As mentioned above, the flow control functionality and the associated flow control feedback from child node to parent node will be the responsibility of the BAP layer. Therefore, the above examples may use buffers at the BAP layer.

Only the buffer status of those bearers which are transiting the node in question may be reported. In other words, the node's own traffic may be deducted. This will already betaken care of if the status of the DL BAP (or another layer) buffers is reported as these only contain data intended for other nodes. However, this will need to include communication between the BAP of the DU part and the BAP of the MT part.

For the DL, one or more of the following aspects of this interaction may be applied. The MT part of the BAP entity receives and processes a request for flow control feedback (e.g., load information). It then either passes this request to the DU part, or in the case of a single BAP entity per node, a centralized entity produces the report. The DU part triggers flow control feedback, and produces relevant information to be included in the report, based on one of the mechanisms above, and either passes the information to the MT part, or in the case of a single BAP entity per node, the centralized entity produces the report. The MT part of the BAP entity sends the flow control feedback. The MT part of the BAP entity receives and processes a request for flow control feedback, and produces and sends the report.

For the UL, one or more of the following aspects of this interaction may be applied. The DU part of the BAP entity receives and processes a request for flow control feedback (e.g., load information). It then either passes this request to the MT part, or in the case of a single BAP entity per node, a centralized entity produces the report. The MT part triggers flow control feedback, and produces relevant information to be included in the report, based on one of the mechanisms above, and either passes the information to the DU part, or in the case of a single BAP entity per node, the centralized entity produces the report. The DU part of the BAP entity sends the flow control feedback. The DU part of the BAP entity receives and processes a request for flow control feedback, and produces and sends the report.

Embodiments of the present disclosure may use one or more of the following formats of the relevant BAP CE from child to parent node. The BAP CE includes the egress link ID and one or more of the link throughput, the desired incoming data rate, an indication of service type carried by this link, the desired (e.g., most suitable) QoS requirements of incoming data, the link buffer occupancy, in absolute terms or as a fraction of a pre-defined or configured threshold, or as a fraction of full buffer occupancy, an indication (e.g., a bit/group of bits/flag) of radio link failure, an indication (e.g., a bit/group of bits/flag) of potential congestion at the child node (of the child node) and an ID of said child node.

The BAP CE includes the bearer ID/bearer group ID and one or more of the desired incoming data rate, the desired (e.g., most suitable) QoS requirements of incoming data, the buffer occupancy, in absolute terms or as a fraction of a pre-defined or configured threshold, or as a fraction of full buffer occupancy, indication of likely/imminent expiration of time stamps (e.g., a certain time, t, before the expiration), and an indication of data type.

In certain examples, one or more of the following actions (e.g., by the parent node or the Donor), which enforce flow control, may be performed: reducing the data for a specific destination (this is especially relevant if the feedback is per backhaul channel), reducing the data rate for specific bearers or a group of bearers, redirecting traffic over different child node either altogether (e.g., all of it), only data belonging to certain bearers/groups of bearers, or only data destined for certain child node(s) of the child node, dropping certain data bearers (e.g., those of lower priority/best-effort data, or those whose time stamps are about to expire and are considered of little use), duplicating certain data bearers (e.g., if the risk of congestion is low and/or if certain backhaul channel(s) face radio link failure), and increasing redundancy/diversity in other ways (e.g., better error correction, lower modulation schemes).

With one-hop flow control feedback (to the parent only), for any centralized decisions (e.g., carried out by the Donor) to be feasible (e.g., those described above), certain examples may provide feedback from the parent node to the Donor according to one or more of the following: piggy-backing on a data bearer, using RRC of the MT part of the parent node, using F1-AP of the DU part of the parent node, and using daisy-chaining at the BAP layer.

A child node may perform a feedback procedure for HbH flow control. The feedback procedure for HbH flow control may be triggered by the child node. The feedback procedure for HbH may be triggered based on any suitable condition, such as a threshold value. The child node may compare a buffer load and the threshold value, and if the buffer load exceeds the threshold value, the feedback procedure for HbH may be triggered. The feedback procedure for HbH may be triggered based on polling by the parent node. The child node may receive a request for a feedback procedure from the parent node and trigger the feedback procedure in response to the request.

After the feedback procedure for HbH is triggered, feedback information may be transmitted to the parent node from the child node. After that, the data for the child node may be received from the parent node. The feedback information transmitted to the parent node may include information related to buffer. Information of an available buffer size may be included in the feedback information. When the parent node receives the feedback information, the data for the child node may be adjusted based on the feedback information. The parent node may reduce the data for the chide node based on the feedback information.

Figure 3:
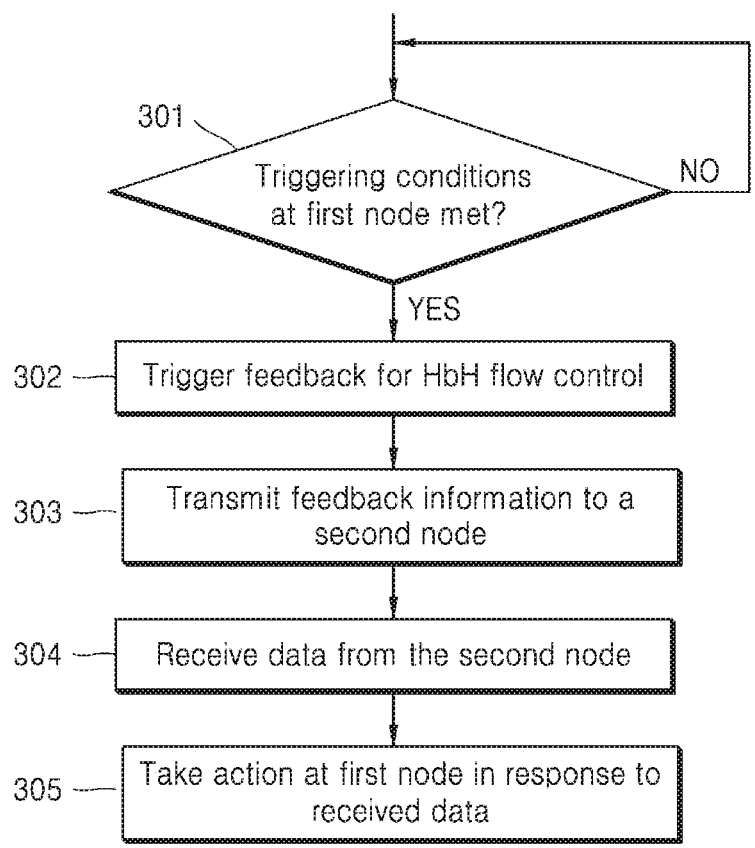
FIG. 3 is a flowchart of HbH flow control, according to an embodiment.

One example of the above technique is illustrated in FIG. 3.

An HbH flow control feedback procedure may be operated based on a specific destination.

FIG. 3 is a flowchart of HbH flow control, according to an embodiment. The steps of FIG. 3 may be performed by an IAB-node (e.g. a first node).

AT a first step 301, it is determined whether one or more triggering conditions at the first node (e.g., a child node) are met. One or more triggering conditions as described above may be applied. If the one or more triggering conditions are not met ("NO" in FIG. 3), then the first step is repeated. On the other hand, if the one or more triggering conditions are met ("YES" in FIG. 3), then a second step 302 is performed.

At the second step 302, feedback is triggered at the first node for HbH flow control. Feedback may be triggered because buffer occupancy at the first node exceeds a certain threshold and/or a report is received from a child node of the first node, and/or an egress link suffers a failure.

At a third step 303, feedback information is transmitted to a second node (e.g., a parent node). The feedback information may include any suitable type of feedback information, such as feedback information as described above. The feedback information may include information relating to an available buffer size.

At a fourth step 304, data is received for the first node from the second node.

At a fifth step 305, action may be taken (e.g., at the first node and/or the second node) in response to the received data. The data for the first node may be adjusted based on the feedback information. The data (e.g., the volume or data rate of the data) for the first node may be reduced based on the feedback information.

According to an embodiment, the present disclosure provides a method, for a first node, for flow control in an IAB system. The method includes triggering feedback for HbH flow control, transmitting, to a second node, feedback information, and receiving, from the second node, data for the first node.

According to an embodiment, the present disclosure provides a first node, for flow control in an IAB system, the first node being configured to trigger feedback for HbH flow control, transmit, to a second node, feedback information, and receive, from the second node, data for the first node.

The feedback information may include information relating to an available buffer size of the first node. The data for the first node may be adjusted based on the feedback information. The data for the first node may be reduced based on the feedback information. The first node may be a child node and the second node may be a parent node.

Figure 4:
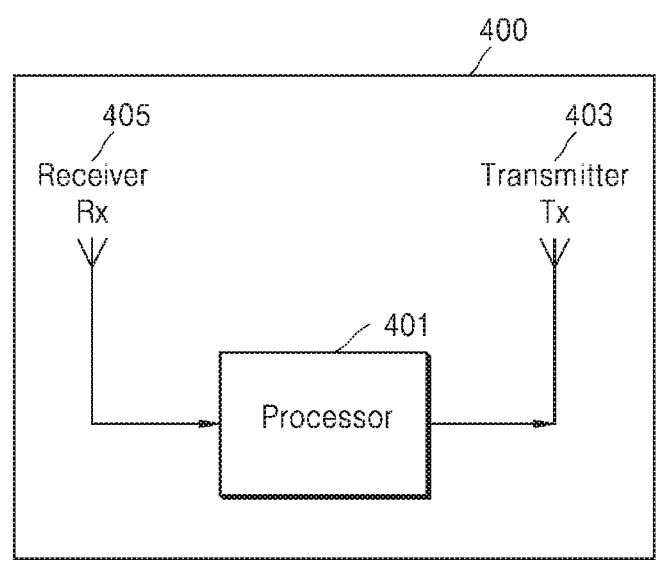
FIG. 4 is a block diagram of a network entity, according to an embodiment.

FIG. 4 is a block diagram of an exemplary network entity, according to an embodiment. One of skill in the art will appreciate that the network entity illustrated in FIG. 4 may be implemented as a network element on a dedicated hardware, as a software instance running on a dedicated hardware, or as a virtualized function instantiated on an appropriate platform, such as on a cloud infrastructure.

The entity 400 may include a processor (or controller) 401, a transmitter 403 and a receiver 405. However, all of the illustrated components are not essential. The entity 400 may be implemented by more or less components than those illustrated in FIG. 4. In addition, the processor 401 and the transmitter 403 and the receiver 405 may be implemented as a single chip.

The receiver 405 is configured for receiving one or more messages from one or more other network entities. The transmitter 403 is configured for transmitting one or more messages to one or more other network entities. The transmitter 403 may include a radio frequency (RF) transmitter for up-converting and amplifying a transmitted signal. The receiver 405 may include a RF receiver for down-converting a frequency of a received signal. However, the transmitter 403 and the receiver 405 may be implemented by more or less components than those illustrated in components. The transmitter 403 and the receiver 405 may be connected to the processor 401. The transmitter 403 may transmit a signal and/or the receiver 405 may receive a signal. The signal may include control information and data. In addition, the receiver 405 may receive the signal through a wireless channel and output the signal to the processor 401. The transmitter 403 may transmit a signal output from the processor 401 through the wireless channel.

The processor 401 is configured for performing operations as described above. The processor 401 may include one or more processors or other processing devices that control the proposed function, process, and/or method. Operation of the entity 400 may be implemented by the processor 401.

Figure 5:
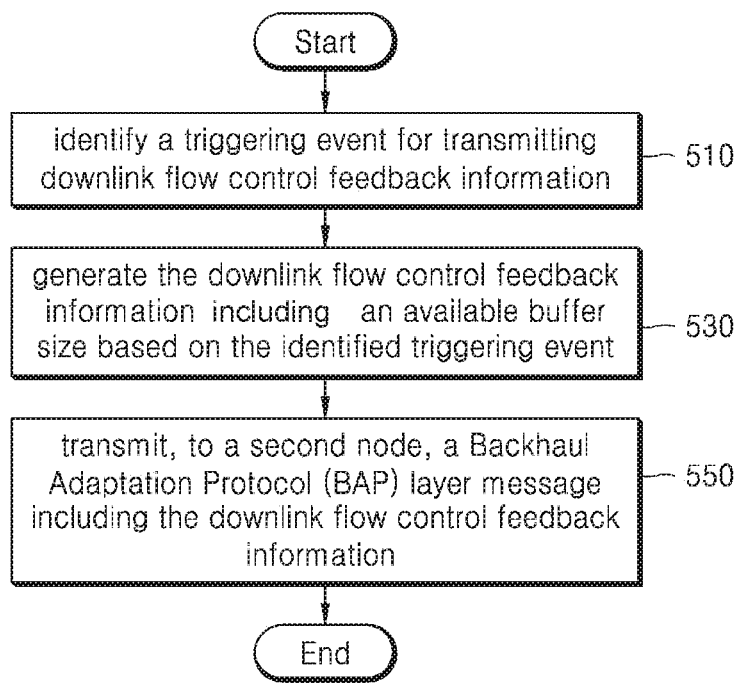
FIG. 5 is a flow diagram of an operation performed by a first node, according to an embodiment.

FIG. 5 is a flow diagram of an operation performed by a first node, according to an embodiment.

As shown in FIG. 5, at step 510, the first node may identify a triggering event for transmitting downlink flow control feedback information. The triggering event for transmitting the downlink flow control feedback information may include at least one of an event associated with a buffer load or an event associated with flow control polling. The event associated with a buffer load may include an event that the buffer load exceeds a certain level. In addition, the event associated with flow control polling may include an event that a BAP control information for flow control polling is received.

At step 530, the first node may generate the downlink flow control feedback information including an available buffer size based on the identified triggering event. The downlink flow control feedback information may include at least one of a first BAP control information and a second BAP control information. The first BAP control information may include at least one of an available buffer size, a type for flow control feedback or an ID of an egress link. In addition, the second BAP control information may include at least one of an available buffer size, a type for flow control feedback, or an identity of a bearer or a bearer group. The available buffer size may include at least one of an available buffer size for an ingress link or an available buffer size for a subset of bearers.

The downlink flow control feedback information may include a BAP control information including a type of control information. The type of control information may include at least one of a type for flow control feedback per backhaul link, a type for flow control feedback per a subset of bearers or a type for flow control feedback polling.

At step 550, the first node may transmit, to a second node, a BAP layer message including the downlink flow control feedback information. The downlink flow control feedback information may be reported only for at least one of a certain bearer, a group of bearers, an egress backhaul channel, an ingress backhaul channel, or flow control polling. The flow control polling is triggered by reception of a BAP control information for flow control polling.

FIG. 6 is a flow diagram of an operation performed by a second node, according to an embodiment.

As shown in FIG. 6, at step 610, the second node may receive, from a first node, downlink flow control feedback information including an available buffer size via a BAP layer signaling based on a triggering event. The triggering event may include at least one of an event associated with a buffer load or an event associated with flow control polling. The downlink flow control feedback information may be included in a BAP layer CE or a BAP layer message.

At step 630, the second node may determine a data rate to reduce based on the received downlink flow control feedback information. The downlink flow control feedback information may be used for reducing the data for a specific destination or reducing the data rate for specific bearers or a group of bearers by the second node. Therefore, the second node can determine the reduced data rate based on the downlink flow control feedback information.

At step 650, the second node may transmit, to the first node, data based on the determined data rate. The flow control can be performed.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

A method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration.

Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

Abbreviations/Definitions

In the present disclosure, the following abbreviations and definitions may be used.
3GPP 3$^{rd}$ Generation Partnership Project
5G 5th Generation
5GC 5G Core
AMF Access and Mobility Management Function
BAP Backhaul Adaptation Layer
CE Control Element
CU Central Unit
D2D Device-to-Device
DL DownLink
DU Distributed Unit
F1 interface between DU and CU
F1-AP F1 Application Protocol
F1-C F1 Control information
F1*-U Modified F1-U (carried over wireless backhaul in IAB)
gNB 5G base station
GTP-U GPRS Tunneling Protocol
FFS For Further Study
IAB Integrated Access and Backhaul
ID Identifier; Identity
MAC Medium Access Control
MT Mobile Terminal or Mobile-Termination
NG Interface between 5G RAN and Core
NGC Control part of NG
NR New Radio
OAM Operation, Administration and Maintenance
PDCP Packet Data Conversion Protocol
PHY Physical
RLC Radio Link Control
RRC Radio Resource Control
QoS Quality of Service
SA mode Stand-Alone mode
SDAP Service Data Adaptation Protocol
SMF Session Management Function
UE User Equipment
UL UpLink
UPF User Plane Function
Uu Air interface between terminal and base station/access point
X2 interface between 2 base stations

What is claimed:

1. A method, performed, by a first node, for flow control in a wireless communication system, the method comprising:
obtaining backhaul adaptation protocol (BAP) configuration information including flow control feedback configuration information indicating a first type for feedback per backhaul radio link control (RLC) channel;
identifying a triggering event for transmitting downlink flow control feedback information;
generating the downlink flow control feedback information comprising a BAP control information for flow control feedback per backhaul RLC channel including an available buffer size for an ingress backhaul RLC channel and flow control feedback type information based on the identified triggering event and the flow control feedback configuration information; and
transmitting, to a second node, a BAP layer message including the downlink flow control feedback information,
wherein the available buffer size corresponds to maximum traffic amount that the second node can transmit as an absolute value.

2. The method of claim 1,
wherein the triggering event for transmitting the downlink flow control feedback information comprises at least one of an event associated with a buffer load or an event associated with flow control polling,
wherein the event associated with a buffer load comprises an event that the buffer load exceeds a certain level, and
wherein the event associated with flow control polling comprises an event that BAP control information for flow control polling is received.

3. The method of claim 1,
wherein the flow control feedback type information comprise a type among the first type for flow control feedback per backhaul RLC channel, a second type for flow control feedback per routing identity, a third type for flow control feedback polling, or a fourth type for radio link failure indication.

4. The method of claim 1,
wherein the downlink flow control feedback information is reported only for at least one of a certain bearer, a group of bearers, an egress backhaul channel, an ingress backhaul channel, or flow control polling.

5. The method of claim 4,
wherein the flow control polling is triggered by reception of a BAP control information for flow control polling.

6. The method of claim 1,
wherein the downlink flow control feedback information is used for reducing the data for a specific destination or reducing the data rate for specific bearers or a group of bearers by the second node.

7. A method, performed, by a second node, for flow control in a wireless communication system, the method comprising:
receiving, from a first node, downlink flow control feedback information comprising a backhaul adaptation protocol (BAP) control information for flow control feedback per backhaul radio link control (RLC) channel including an available buffer size for an ingress backhaul RLC channel and flow control feedback type information; and
determining to reduce at least one of data for a specific destination or data rate for a bearer or a bearer group based on the received downlink flow control feedback information,
wherein the available buffer size corresponds to maximum traffic amount that the second node can transmit as an absolute value.

8. The method of claim 7,
wherein the flow control feedback type information comprise a type among the first type for flow control feedback per backhaul RLC channel, a second type for flow control feedback per routing identity, a third type for flow control feedback polling, or a fourth type for radio link failure indication.

9. The method of claim 7,
wherein the downlink flow control feedback information is reported only for at least one of a certain bearer, a group of bearers, an egress backhaul channel, an ingress backhaul channel, or flow control polling, and
wherein the flow control polling is triggered by reception of a BAP control information for flow control polling.

10. A first node for flow control in a wireless communication system, the first node comprising:
a transceiver; and
at least one processor, the at least one processor comprised to:
obtain backhaul adaptation protocol (BAP) configuration information including flow control feedback configuration information indicating a first type for feedback per backhaul radio link control (RLC) channel,
identify a triggering event for transmitting downlink flow control feedback information,
generate the downlink flow control feedback information comprising a BAP control information for flow control feedback per backhaul RLC channel including an available buffer size for an ingress backhaul RLC channel and flow control feedback type information based on the identified triggering event and the flow control feedback configuration information, and
transmit, to a second node, a BAP layer message including the downlink flow control feedback information,
wherein the available buffer size corresponds to maximum traffic amount that the second node can transmit as an absolute value.

11. The first node of claim 10,
wherein the triggering event for transmitting the downlink flow control feedback information comprises at least one of an event associated with a buffer load or an event associated with flow control polling,
wherein the event associated with a buffer load comprises an event that the buffer load exceeds a certain level, and
wherein the event associated with flow control polling comprises an event that BAP control information for flow control polling is received.

12. The first node of claim 10,
wherein the flow control feedback type information comprise a type among the first type for flow control feedback per backhaul RLC channel, a second type for flow control feedback per routing identity, a third type for flow control feedback polling, or a fourth type for radio link failure indication.

13. The first node of claim 10,
wherein the downlink flow control feedback information is reported only for at least one of a certain bearer, a group of bearers, an egress backhaul channel, an ingress backhaul channel, or flow control polling.

14. The first node of claim 13,
wherein the flow control polling is triggered by reception of a BAP control information for flow control polling.

15. The first node of claim 10,
wherein the downlink flow control feedback information is used for reducing the data for a specific destination or reducing the data rate for specific bearers or a group of bearers by the second node.

16. A second node for flow control in a wireless communication system, the second node comprising:
a transceiver; and
at least one processor, the at least one processor configured to:
receive, from a first node, downlink flow control feedback information comprising a backhaul adaptation protocol (BAP) control information for flow control feedback per backhaul radio link control (RLC) channel including an available buffer size for an ingress backhaul RLC channel and first flow control feedback type information, and
determine to reduce at least one of data for a specific destination or data rate for a bearer or a bearer group based on the received downlink flow control feedback information,
transmit, to the first node, data based on the determined data rate,
wherein the available buffer size corresponds to maximum traffic amount that the second node can transmit as an absolute value.

17. The second node of claim 16,
wherein the flow control feedback type information comprise a type among a first type for flow control feedback per backhaul link, a second type for flow control feedback per routing identity, a third type for flow control feedback polling, or a fourth type for radio link failure indication.

18. The second node of claim 16,
wherein the downlink flow control feedback information is reported only for at least one of a certain bearer, a group of bearers, an egress backhaul channel, an ingress backhaul channel, or flow control polling, and
wherein the flow control polling is triggered by reception of a BAP control information for flow control polling.

* * * * *